United States Patent
Divakaran et al.

(10) Patent No.: US 10,303,768 B2
(45) Date of Patent: May 28, 2019

(54) EXPLOITING MULTI-MODAL AFFECT AND SEMANTICS TO ASSESS THE PERSUASIVENESS OF A VIDEO

(71) Applicant: SRI International, Menlo Park, CA (US)

(72) Inventors: Ajay Divakaran, Monmouth Junction, NJ (US); Behjat Siddiquie, Plainsboro, NJ (US); David Chisholm, Menlo Park, CA (US); Elizabeth Shriberg, Berkeley, CA (US)

(73) Assignee: SRI International, Menlo Park, CA (US)

( * ) Notice: Subject to any disclaimer, the term of this patent is extended or adjusted under 35 U.S.C. 154(b) by 35 days.

(21) Appl. No.: 14/874,348

(22) Filed: Oct. 2, 2015

(65) Prior Publication Data

US 2016/0328384 A1    Nov. 10, 2016

Related U.S. Application Data

(60) Provisional application No. 62/156,426, filed on May 4, 2015, provisional application No. 62/156,425, filed on May 4, 2015.

(51) Int. Cl.
| | |
|---|---|
| *G06K 9/00* | (2006.01) |
| *G06F 17/24* | (2006.01) |
| *G06F 17/27* | (2006.01) |
| *G06F 17/30* | (2006.01) |
| *H04N 21/45* | (2011.01) |
| *H04N 21/466* | (2011.01) |

(52) U.S. Cl.
CPC ........ *G06F 17/2785* (2013.01); *G06F 17/241* (2013.01); *G06F 17/271* (2013.01); *G06F 17/2765* (2013.01); *G06F 17/30867* (2013.01); *G06K 9/00718* (2013.01); *G06K 9/00744* (2013.01); *H04N 21/4532* (2013.01); *H04N 21/4668* (2013.01)

(58) Field of Classification Search
CPC ............... H04N 21/4532; H04N 21/47; H04N 21/4668; G06Q 30/0251; G06F 17/30867
See application file for complete search history.

(56) References Cited

U.S. PATENT DOCUMENTS

| | | | |
|---|---|---|---|
| 6,585,521 B1 * | 7/2003 | Obrador | G09B 23/28 369/27.01 |
| 6,993,535 B2 * | 1/2006 | Bolle | G06F 17/30253 |
| 7,370,342 B2 * | 5/2008 | Ismail | H04H 60/06 348/E5.002 |
| 8,635,105 B2 * | 1/2014 | Pradeep | G06Q 30/02 705/14.42 |
| 9,087,297 B1 * | 7/2015 | Filippova | G06N 5/025 |

(Continued)

OTHER PUBLICATIONS

Strapparava, Carlo, Marco Guerini, and Oliviero Stock. "Predicting Persuasiveness in Political Discourses." LREC. 2010.*

(Continued)

*Primary Examiner* — Matthew H Baker
(74) *Attorney, Agent, or Firm* — Moser Taboada

(57) ABSTRACT

Technologies to detect persuasive multimedia content by using affective and semantic concepts extracted from the audio-visual content as well as the sentiment of associated comments are disclosed. The multimedia content is analyzed and compared with a persuasiveness model.

20 Claims, 8 Drawing Sheets

(56) References Cited

U.S. PATENT DOCUMENTS

| | | | |
|---|---|---|---|
| 9,552,442 B2* | 1/2017 | Hill | G06F 17/30964 |
| 9,684,871 B2* | 6/2017 | Myslinski | G06F 17/30867 |
| 2006/0212900 A1* | 9/2006 | Ismail | H04H 60/06 |
| | | | 725/34 |
| 2007/0043617 A1* | 2/2007 | Stein | G06Q 30/0267 |
| | | | 705/14.64 |
| 2008/0091517 A1* | 4/2008 | Koonce | G06Q 30/02 |
| | | | 705/14.42 |
| 2012/0254333 A1* | 10/2012 | Chandramouli | G06F 17/27 |
| | | | 709/206 |
| 2013/0179766 A1* | 7/2013 | Madnani | G06F 17/241 |
| | | | 715/230 |
| 2014/0040019 A1* | 2/2014 | Zheng | G06Q 30/0251 |
| | | | 705/14.45 |
| 2014/0214429 A1* | 7/2014 | Pantel | G10L 21/16 |
| | | | 704/275 |
| 2014/0279078 A1* | 9/2014 | Nukala | G06Q 30/0243 |
| | | | 705/14.73 |
| 2016/0057492 A1* | 2/2016 | Jaffe | H04N 21/23424 |
| | | | 725/10 |
| 2016/0321336 A1* | 11/2016 | Aharoni | G06F 17/30572 |

OTHER PUBLICATIONS

"Audio-Based Affect Detection in Web Videos" authored by Chisholm, Dave et al. [IEEE International Conference on Multimedia and Expo, (ICME) 2015, Dave Chisholm, Behjat Siddiquie, Ajay Divakaran and Elizabeth Shriberg; http://www.cs.umd.edu/~behjat/papers/ICME15.pdf].

"Exploiting Multimodal Affect and Semantics to Identify Politically Persuasive Web Videos" authored by Siddiquie, Behjat et al. [ACM International Conference on Multimodal Interaction, (ICMI) 2015 Behjat Siddiquie, Dave Chisholm and Ajay Divakaran; http://www.cs.umd.edu/~behjat/papers/ICMI15.pdf].

* cited by examiner

EXPLOITING MULTI-MODAL AFFECT AND SEMANTICS TO ASSESS THE PERSUASIVENESS OF A VIDEO

CROSS-REFERENCE TO RELATED APPLICATIONS

This application claims the benefit of and priority to U.S. Provisional Patent Application Ser. No. 62/156,426, filed May 4, 2015, which is incorporated herein by this reference in its entirety.

This application claims priority to U.S. Provisional Patent Application Ser. No. 62/156,425, filed May 4, 2015, which is incorporated herein by reference in its entirety.

GOVERNMENT RIGHTS

This invention was made in part with government support under contract number W911NF-12-C-0028 through IBM Corporation subcontract 4914004308 awarded by the U.S. Army Research Office. The U.S. Government has certain rights in this invention.

BACKGROUND

In the last few years, social media has rapidly emerged as a prominent medium for information dissemination. The potential to reach a large and geographically diverse audience along with the ability to upload multimedia data, such as still images and videos, has ensured that social media is now used for journalism, marketing, advertising, and even propagating political views. Its low barrier of entry allows not just large and well-funded organizations but also individuals to share and propagate their opinions and viewpoints with a global audience. In particular, social media is used to influence the public, persuade politically, and even radicalize. Social media sites are considered a potent tool to influence and attract new followers and there is a great need to detect and assess politically charged or otherwise persuasive social media content.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
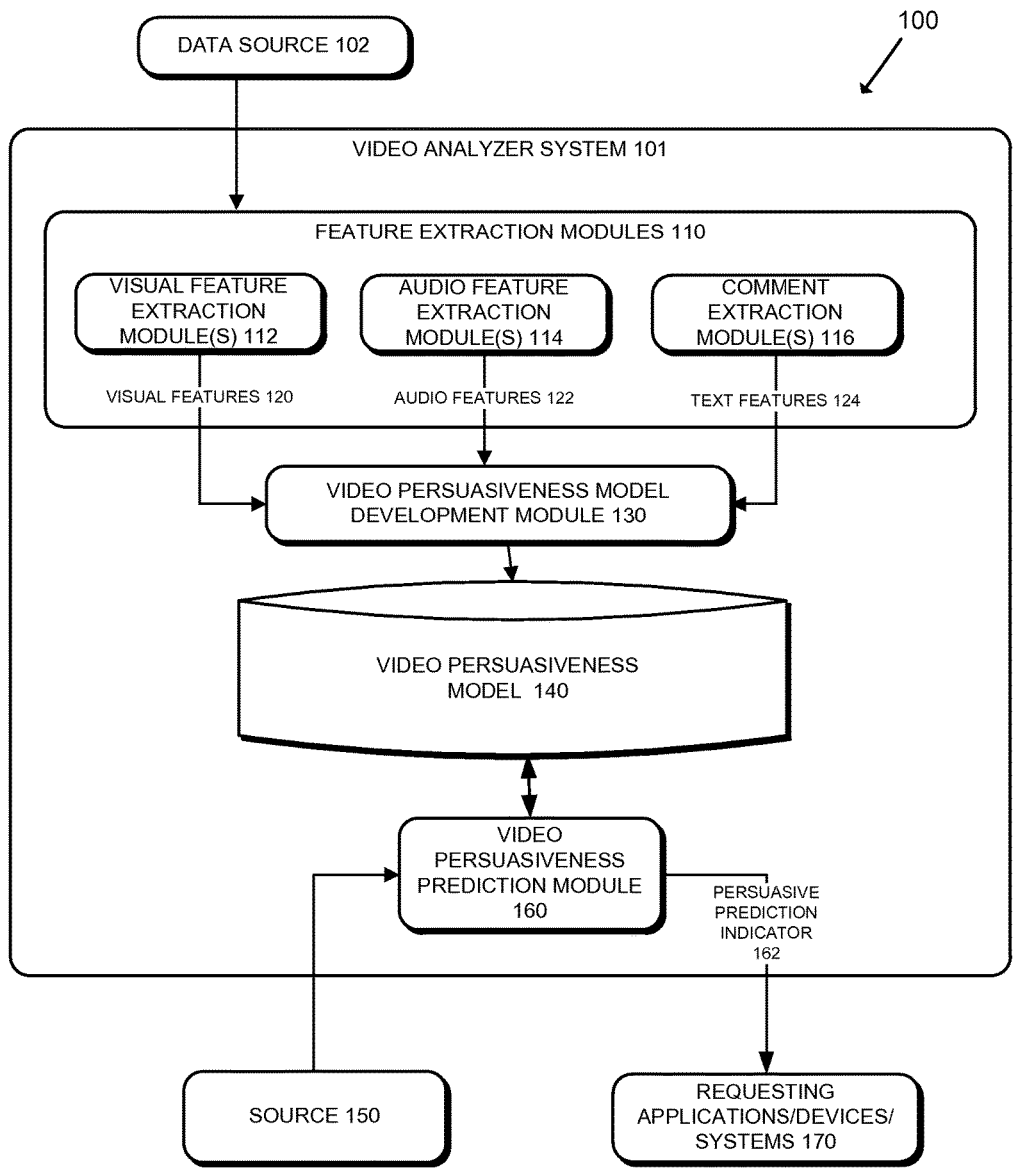
FIG. 1 is a simplified module diagram of at least one embodiment of an environment of a computing system including components for a video persuasiveness model development module and a video persuasiveness prediction module as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Two papers authored by the inventors of this application are considered relevant to this disclosure and are hereby incorporated by reference as if submitted in their entirety. The first, "Audio-Based Affect Detection in Web Videos" authored by Chisholm, Dave et al., is directed towards the detecting of audio concepts in web content as well as video sequence parsing. By focusing on affective concepts, a new dataset is established based on videos where a speaker is at least attempting to persuade a crowd, or alternatively referred to as a "Rallying a Crowd" variable. A classifier is generated based on this dataset and is then used to determine the classification of web content using audio segmentation techniques. The second, "Exploiting Multimodal Affect and Semantics to Identify Politically Persuasive Web Videos" authored by Siddiquie, Behjat et al., is directed towards the automatic classification of web videos based on a level of perceived persuasiveness. The classification is determined through the extraction of audio, visual, and textual features.

Two important characteristics of social media are its ability to affect strongly the emotional state and arousal level of participants along with the ability to observe reactions in the form of comments. Audio-visual content affects viewers more strongly than text-based content. For instance, research indicates stimuli such as emotional images can induce higher amounts of physiological arousal than verbal stimuli. Video sharing sites, such as YOUTUBE or VIMEO, allow viewers to post comments to a video. The posted comments can then be further analyzed to determine the common reception to the video (positive or negative). This leads to a way for the video producers, or content producers, or a third party, to observe the impact of a message contained within a video on viewers as a whole or possibly on a targeted demographic.

This disclosure relates to the technical fields of machine learning-based data analysis with respect to predicting the impact that multimedia content may have on viewers. This is done by analyzing a combination of audio, visual, and/or textual features present in or associated with an instance or collection of imagery (e.g. still images or videos), and focusing on the extraction of both semantic and affective information from the multimedia content. For audio content, classifiers are trained for several grades of speech arousal that are effective across variable capture conditions and audio quality. Further, feature detectors may be used to detect and analyze further categories related to the audio content, for example, crowd reaction and/or music. The classifiers may enable temporal localization of events of interest within analyzed videos, such as a highly animated speaker or a call-and-response pattern between leaders and crowds during events, such as a rally or a protest. For visual content, the video is analyzed to detect both visual sentiment and semantic content. To determine viewer reaction, comments associated with a video are analyzed for sentiment. The disclosed examples focus mainly on analysis of videos (such as professional and/or amateur "in the wild" videos uploaded to the World Wide Web). However, it should be understood that these examples are illustrative only, and aspects of the disclosed techniques can be applied to still images or collections of multimedia content (e.g., collections that include images, videos, and text) equally as well.

Certain videos, such as so-called politically persuasive videos, generate more negative reactions, as opposed to positive reactions. Using the techniques described in the present disclosure, one may accurately predict the sentiment of reactions with a reasonable degree of success.

Aspects of this disclosure include:
1. A Rallying a Crowd (RAC) dataset—which comprises of positive and negative examples of persuasive videos. Positive examples include, but are not limited to, events such as speeches, rallies, or protests. Negative examples include, but are not limited to, semantically similar content as the positive examples, but lack the highly affected, persuasive nature of the positive examples. Videos for the RAC dataset originate from varied cultures and/or from one or more languages. Furthermore, the majority of the audio tracks in the RAC dataset are rigorously double annotated.
2. A robust approach to extracting affective and semantic audio concepts from videos. State-of-the art machine learning approaches are utilized to extract affective and semantic information from videos for the analysis of visual and textual content.
3. Extracted affective and semantic information is used to predict whether the video is of a persuasive nature. For example, the video may be predicted to be strongly politically persuasive or not politically persuasive.
4. Analysis of comments. Persuasive videos, or politically persuasive videos, may generate more negative reactions in comment sections associated with a video. Affective content of a video may indicate how viewers will likely react to the video. Viewer reaction to semantically similar videos varies with respect to a certain video's affective content.

Referring now to FIG. 1, an embodiment of the computing system 100 is shown in the context of a video analyzer system 101 (e.g., a physical or virtual execution or runtime environment). The illustrative computing system 100 may include at least one data source of multimedia data from data source 102, one or more feature extraction modules 110 (which may include a number of subcomponents, described below), a video persuasiveness model development module 130, and a video persuasiveness model 140 (which may be implemented as a database). The system 101 may further include another data source, input video 150, in communication with video persuasiveness prediction module 160 (which may be in communication with model 140) which generates a persuasive prediction indicator 162, and one or more other requesting applications/devices/systems 170. Each of the components of the computing system 100 and their respective subcomponents may be embodied as hardware, software, a combination of hardware and software, or another type of physical component.

This disclosure describes specific examples of the inventive technology that are directed to assessing absolute persuasiveness (e.g., persuasive or not persuasive) or relative degrees of persuasiveness (e.g., this video is more persuasive than that video; this video is highly persuasive, etc.). In other embodiments, the disclosed technology is used to assess absolute (e.g., did the video have or not have an impact of a certain type) or relative degrees of one or more types of emotional or affective impact of visual media (e.g., this video is more or less impactful than that video, this video is strongly impactful or mildly impactful, in a positive or negative direction). The types of audience impact that can be assessed by system include agitation, arousal, boring, calming, etc.). As such, it should be understood that references herein to "persuasiveness" components (e.g., persuasiveness model 140, persuasiveness prediction module 160 can refer more generally to components that model and predict audience impact more generally, and may be referred to as an "impact model" and "impact prediction module" in some embodiments.

The feature extraction modules 110 use automated techniques, such as computer vision algorithms, acoustic signal processing algorithms, and/or natural language processing algorithms, to capture and extract features from the input source 102 during operation of the computing system 100. The illustrative data source 102 may be embodied as any hardware, software, or combination of hardware and software capable of performing the functions described herein. For instance, the data source 102, may include one or more video inputs, like a web video, as mentioned above, and/or others. Alternatively or in addition, the data source 102, may include computers, computer networks, memory, storage devices, or any other types of devices capable of storing and/or transmitting stored or recorded multimodal data such as audio files, digital image files, video clips, and/or other types of data files.

The illustrative feature extraction modules 110 and each of its sub-components, submodules, and data structures may be embodied as any hardware, software, or combination of hardware and software capable of performing the functions described herein. For example, the feature extraction modules 110 may include data acquisition and extraction routines to perform visual, audio, and/or comment extraction. Feature extraction modules 110 may include visual feature extraction module(s) 112, audio feature extraction module(s) 114, and natural language feature extraction module(s) 116, which may all provide feature extraction information to video persuasiveness development module 130. Visual feature extraction module(s) 112 may provide tagged, or annotated, visual features 120. Audio feature extraction module(s) 114 may provide tagged, or annotated, audio features 122. natural language feature extraction module(s) 116 may provide tagged, or annotated, text features 124.

The video analyzer system 101 utilizes a video persuasiveness model development module 130 to build a video persuasiveness model 140. The video persuasiveness model 140 is used in conjunction with the video persuasiveness prediction module 160 to predict a level of persuasiveness of an input video 150.

An initial dataset, e.g., data source 102, which may comprise a multimedia format, may be utilized to train, or develop, the video persuasiveness model 140. A dataset may be collected from an online video sharing site (e.g., YOU-TUBE) which may comprise a number of positive videos and a number of negative videos. To train the video persuasiveness model 140, certain videos may be carefully selected, such as, for example, an animated speaker rallying a crowd with a persuasive message, if such videos are used by themselves or as part of a larger persuasive campaign. Further, the data collection for a dataset may be independent of language or environment. In other words, the dataset may comprise video samples including speakers speaking in different languages, and aspects of the disclosed technologies can perform feature detection and measure persuasiveness irrespective of the language used in the video.

Videos in the dataset may be recorded under a wide variety of conditions (e.g., outdoor vs. indoor, near vs. far) with various levels of post-production (e.g., professional quality clips vs. unedited amateur footage). Speakers in the videos may be from all over the world and may even be bilingual or trilingual and switch languages during the course of the video. Using these methods, a dataset may cover a wide diversity of persuasive content worldwide.

When collecting videos, a graded approach may be used to assess the relative degree of audience impact in terms of a positive or negative emotional or affective score or rating. Some negatively-rated videos are totally different from the positively-rated videos in terms of content and affect, while others have varying degrees of similarity with the positive samples. In particular, some negative samples may include events such as public interviews or even stand-up comedy that have similarities in common with the positive samples (e.g., enthusiastic crowd response) but may lack strongly affected speech and/or may have a different pace. To prevent over-fitting to specific speakers, negatively-rated videos in the dataset may include some of the same speakers who were also present in other positively-rated videos. An example of this is a data set that includes a video of a speaker speaking thoughtfully and calmly in an interview (which may result in a low or negative audience persuasiveness/impact score) and also includes a video of the same speaker exhorting a crowd to action (which may result in a high or positive audience persuasiveness/impact score).

Figure 2:
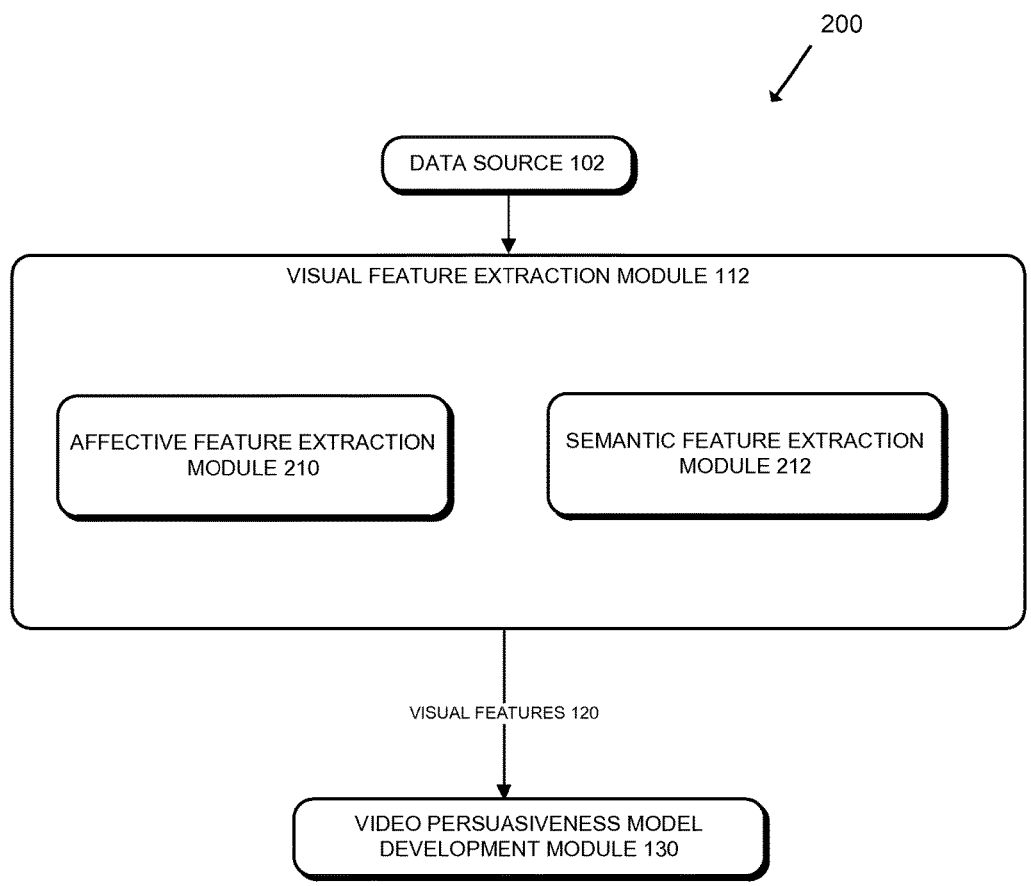
FIG. 2 is a simplified schematic diagram of embodiments of the visual feature extraction module.

Referring now to FIG. 2, a simplified illustration of an embodiment 200 of the visual feature extraction module 112 is shown. In FIG. 2, a raw (e.g., non-tagged) multimedia data source 102 is analyzed for classification. The visual feature extraction module 112 may comprise two subcomponents, affective feature extraction module 210 and semantic feature extraction module 212. In some embodiments, visuals of content considered to be persuasive are assumed to be more striking and extreme as opposed to non-persuasive content. To determine for classification and learning purposes, deep learning based features that identify semantic concepts and sentiment may be used. For example, deep learning models, such as Convolutional Neural Networks (CNNs), which are variants of multilayer perceptrons consisting of multiple convolutional and pooling layers followed by fully connected layers, may be used to identify semantic concepts from extracted lower level features. For training of the video persuasiveness model development module 130, and to create tagged visual features 120, at least two different neural networks using different datasets may be used. For instance, a first neural network may be trained using the ImageNet dataset and a second neural network may be trained using the Visual Sentiment Ontology dataset.

ImageNet is an image database organized according to the WordNet hierarchy in which each node of the hierarchy is depicted by hundreds and thousands of images. Using the ImageNet dataset, the presence or absence of certain concepts in an image indicating persuasive content may be evaluated. In order to estimate the presence or absence of concepts in an image, a CNN can be trained on a dataset, such as the ILSVRC-2012 dataset, which is a subset of ImageNet consisting of around 1.2 million labeled data with 1000 different classes ranging from elephant to space shuttle to stethoscope. The CNN is trained to maximize the multinomial logistic regression objective for these classes over training data. During training, the 1000 different classes provide a 1000 dimensional output to indicate the presence or absence of each class. Outputs of intermediate layers of the neural network may be used which represent more abstract visual features than the final concept outputs and can often provide high classification performance as three features. These three features may be referred to as "prob", "fc7", and "fc8". Each of these features may be extracted from every $30^{th}$ frame (1 second) of the video. A vector of dimension F×D, where F is the number of frames sampled and D is the dimensionality, is established. Since F will vary based on the length of the video, the feature vector may be linearly resized to $F_{fixed} \times F$, wherein $F_{fixed} = 100$. Each of the three features may be provided individually to a (Gaussian) radial basis function (RBF) Support Vector Machine (SVM) based classifier, and all features may also be combined by concatenation.

For visual sentiment ontology concepts, the presence or absence of certain visual sentiment concepts in a video can provide information on whether a video contains persuasive content. The Visual Sentiment Ontology dataset, which consists of approximately 930,000 images, was established by searching FLICKR for Adjective-Noun-Pairs (ANPs) such as "beautiful flower" or "disgusting food." The advantage of ANPs is that they relate to particular images of sentiment neutral nouns (e.g., "flower") to a strong sentiment by adding an adjective (e.g., "beautiful flower"). The concepts capture both semantic and sentiment information. The concept detectors may be trained using the deep learning network. Using the final "prob" outputs as well as the intermediate layer outputs "fc7" and "fc8" the classifier inputs, or tagged visual features 120, may be provided for the video persuasiveness model development module 130.

Figure 3:
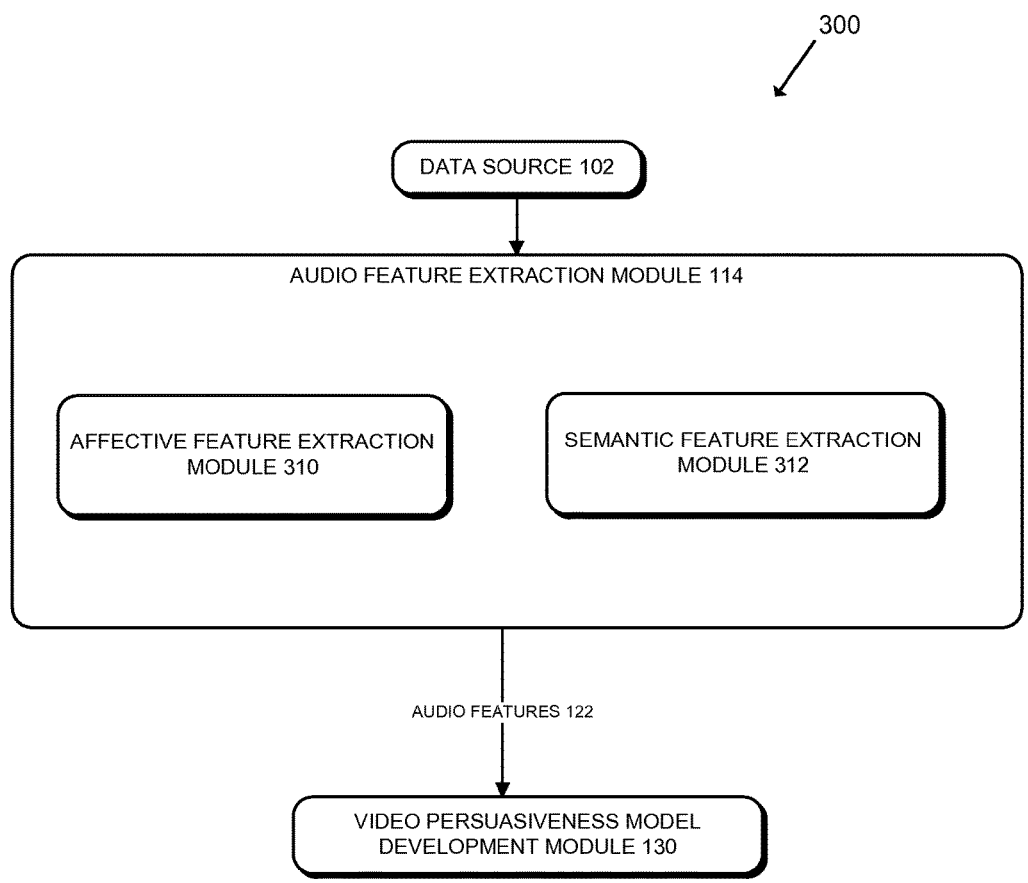
FIG. 3 is a simplified schematic diagram of embodiments of the audio feature extraction module.

Referring now to FIG. 3, a simplified illustration of an embodiment 300 of the audio feature extraction module 114 is shown. In FIG. 3, raw (e.g., non-tagged) multimedia data source 102 is analyzed for classification. The audio feature extraction module 114 may comprise two subcomponents, affective feature extraction module 310 and semantic feature extraction module 312. Using the audio feature extraction module 114 and the respective subcomponents 310 and 312, tagged audio features 122 may be generated and sent to the video persuasiveness model development module 130.

To initially create the tagged audio features 122, the dataset may undergo manual data annotation for testing and training data for the audio concept detectors in the model. For example, a dataset of videos may be doubly annotated by two human subjects. Each annotator may divide an entire audio track into disjoint segments that are considered homogeneous based on their content. Segments may be of any length, but generally do not overlap the entire audio track. Each annotator may then assign each segment at least one characteristic, such as those audio categories listed in Table 1, or be marked as "ignore" (e.g., silence, static, or otherwise not covered by the classes in Table 1). Annotators may listen to, but may not view, the videos to prevent visual cues from affecting judgment of the audio content.

TABLE 1

| AUDIO CATEGORIES |
| --- |
| 1. Crowd |
| 2. Music + Crowd |
| 3. Music |
| 4. Music + Speech |
| 5. Crowd + Speech |
| 6. Calm Speech |
| 7. Slightly Agitated Speech |

TABLE 1-continued

AUDIO CATEGORIES

8. Agitated Speech
9. Very Agitated Speech

For automated audio concept detection, a number, e.g., four, of sets of features may be extracted from the audio signal of each video. For instance, Mel-Frequency Cepstral Coefficients (MFCCs) and Spectrogram features may be used for audio concept detection. Prosody (or prosodic) features, such as speaking rate, loudness, and pitch, have been shown to be effective for detecting emotional content in speech and can be derived from the acoustic features of the speech signal. Acoustic Unit Descriptors (AUDs) model distributions of short audio sequences and therefore capture local temporal variations within the signal. MFCCs, Spectrogram features, and Prosody features may be further processed into bag-of-words representations. To do so, both normalized versions of the features (which capture pitch based characteristics well) and un-normalized versions of these features (which capture loudness based characteristics well) may be quantized according to vocabularies of, e.g., size 10000, with each vocabulary built via a hierarchical k-means clustering approach. AUDs themselves use a quantized representation, and so may be simply processed into histograms without having to be built into a vocabulary.

Further testing and training may be performed using snippets of conceptually homogeneous audio clips. This may be done by using any time intervals in a video where both annotators (described above) agreed on the concept as such a snippet. Each of the four types of features as described above may be extracted from each of the snippets for concept detection. Training may be performed using a non-linear SVM with a radial basis function kernel ("RBF SVM") for concept classification. In order to combine the features, a composite kernel that is a convex combination of kernels learned for each individual feature for SVM based concept detection may be computed. The combination parameters may be learned using the Multiple Kernel Learning approach, which is effective at combining heterogeneous features.

In order to obtain concept scores that are considered useful for classifying a video as persuasive or non-persuasive, the audio portion may be segmented into homogeneous subsections. A single concept label will very rarely apply to an entire audio track. An example approach is to divide the track into uniform, fixed-length, non-overlapping segments and then classify each. Another example is to utilize the Simple Linear Iterative Clustering (SLIC) algorithm for image segmentation and adapt it to audio data. This may be done by initializing the cluster centers corresponding to each segment by sampling the audio frames at regular intervals. Next, the initialized segments may be iteratively refined in a two step process. The first step involves assigning each frame to a cluster-center in a local neighborhood by computing the distance in the feature space. The second step involves updating the cluster centers to reflect the new assignments. These steps are continued until the segmentation converges. SLIC is extremely fast and allows for segmentation to be done at multiple scales. The SLIC algorithm may segment at different granularity levels (e.g., fine, medium, and coarse scales).

In at least one embodiment, for classifier setup, take a set of n videos $V=\{V_1, V_2, V_3, \ldots, V_n\}$ and their corresponding binary labels $\{y_1, y_2, y_3, \ldots, y_n\}$ that indicate whether the video contains persuasive content. For each video $V_i$, segment the audio and then compute the audio concept scores as described above. Four concept scores may be computed at each scale, using the MFCC, Spectrogram, Prosody, and/or All Feature Kernels. The audio concept scores are denoted for video $V_i$ as $O_{isf}$, where i denotes the video index, s refers to the segmentation scale (fine, medium, coarse) and f indicates the low level feature used (Prosody, MFCC, Spectrogram, All Features). The dimensionality of an audio concept score $O_{isf}$ is T×C, where T is the number of segments (dependent on the scale of the segmentation and length of the video) and C is the number of audio concepts. $O_{isf}$ is quantized by linearly resizing it to $T_{fixed} \times C$, where $T_{fixed}=100$ to obtain $\overline{O}_{isf}$. Now corresponding to each video $V_i$ with a scale s, there is a fixed dimensional feature $\overline{O}_{isf}$. The RBF SVM is then trained for classification using this data.

Figure 4:
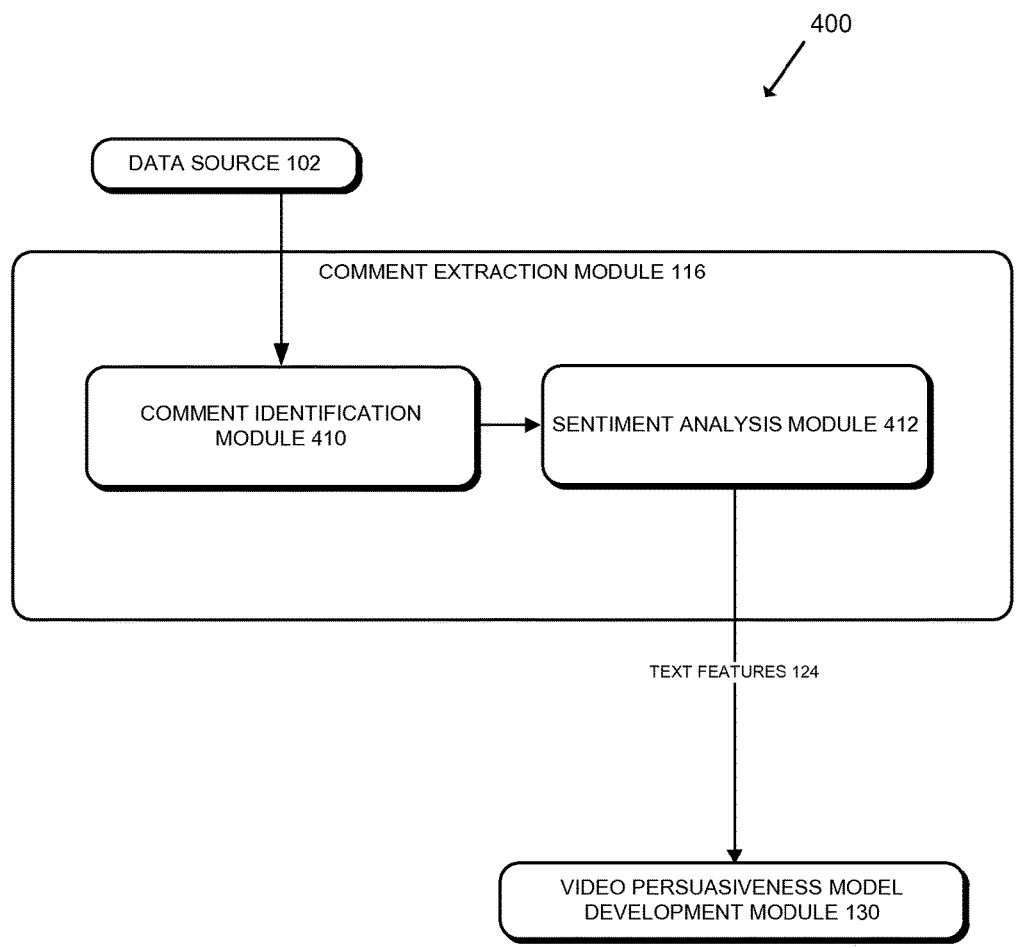
FIG. 4 is a simplified schematic diagram of embodiments of the comment feature extraction module.

Referring now to FIG. 4, a simplified illustration of an embodiment 400 of the comment extraction module 116 is shown. In FIG. 4, raw (e.g., non-tagged) multimedia data source 102 is analyzed for classification. The comment extraction module 116 may comprise two subcomponents, comment identification module 410 and sentiment analysis module 412. Using the comment extraction module 116 and the respective subcomponents 410 and 412, tagged text 124 may be generated and sent to the video persuasiveness model development module 130.

The text associated with videos may include, but is not limited to comments, meta-data, and other textual information that are associated with the video, e.g., by virtue of a supporting software application, such as FACEBOOK, YOUTUBE, or INSTAGRAM (as opposed to text that may be extracted from the video itself by optical character recognition techniques). For example, videos uploaded to YOUTUBE and other video-sharing sites often generate a large number of comments posted by viewers, many of which contain reaction of people to the videos. Intuitively, comments generated in response to persuasive videos, or more particularly politically persuasive videos, may be more polarized in nature while other videos generate comments of a more neutral or positive nature. Therefore, exploiting the sentiments contained within the comments may provide an indication of persuasiveness. Videos may also contain natural language content in the form of speech as visuals (i.e., text within the video).

In one embodiment, all of the comments associated with a video, for this example a YOUTUBE video, may be extracted via an existing application programming interface (API), such as the YOUTUBE API. The number of comments associated with different videos may vary greatly. Further, videos may comprise a geographically diverse range of topics and/or speakers, therefore some languages associated with the videos may be non-English. A pre-processing step may be performed to automatically filter out non-English text. This may be done utilizing a standard English text corpus. The extracted comments may then undergo further processing. For example, using either Sentiment Analysis of Tweets using SVMs (a SATSVM) or DeepCompositionModel.

SATSVM is used for social media data and relies on extracting features from a comment and training an SVM to classify the comment as having a positive or negative sentiment. Using SVM decision scores, the output roughly indicates a degree of positivity or negativity in the extracted comment.

DeepCompositionModel uses a Recursive Neural Tensor Network to build a representation of sentences based on their structure and computes sentiment by accounting for how the constituent words compose with each other. The DeepCompositionModel splits each comment into its sentences and assigns a separate sentiment score to each sentence. The output is a 5-dimensional probability vector indicating the probability of the sentence being Strongly Negative, Negative, Positive, or Strongly Positive.

For exemplary purposes using SATSVM, given a video $V_i$ and a set of associated comments $C_i$ consisting of N individual comments $\{c_{i1}, c_{i2}, c_{i3}, \ldots, c_{iN}\}$, on each element $C_i$ to get a set of N scores $\{x_{i1}, x_{i2}, x_{i3}, \ldots, x_{iN}\}$ normalized within the range $[-1,1]$. The scores may be quantized by binning them into a histogram of eleven equally spaced bins. Using this technique, each video $V_i$ may be represented by a fixed dimensional histogram $H_i$. An RBF SVM using these histogram features may then be trained for classifying videos into persuasive versus non-persuasive categories.

For exemplary purposes using DeepCompositionModel, for each video $V_i$ the sentiment for each comment $\{c_{i1}, c_{i2}, c_{i3}, \ldots, c_{iN}\}$ is extracted obtaining $X_i=\{x_{i1}, x_{i2}, x_{i3}, x_{iM}\}$, where $M(>N)$ is the total number of sentences. Each $x_{ij}$ is a 5 dimensional probability vector as described above. Each video $V_i$ is represented by a set of these features $X_i$. The SVM is then trained, e.g., using a pyramid match kernel.

Multimodal fusion may be used to fuse the information from the audio, visual, and text modalities. Three different fusion strategies may be employed, including, but not limited to, Early Fusion, Simple Late Fusion, and Learning based Late Fusion. In one example, fusion generally may include spectrogram features for audio, fc7 features from the sentiment ontology for video, and the SATSVM features for text. For Early Fusion, the features from all of the modalities may be concatenated and used to train the RBF SVM for classification. In Simple Late Fusion the decision scores from each modality may be combined (e.g., added up) to arrive at a composite decision score to perform classification. For Learning based Late Fusion, a logistic regression based fusion that combines the decision score from each modality in a weighted manner can be utilized for training.

Figure 5:
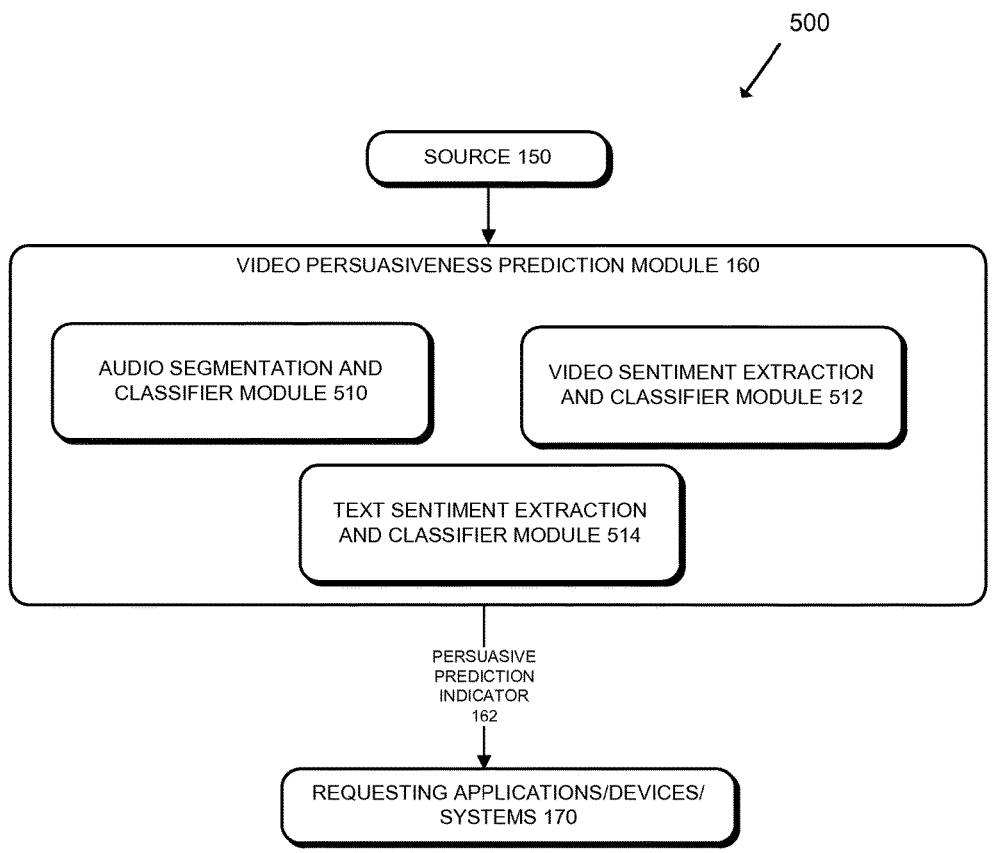
FIG. 5 is a simplified schematic diagram of embodiments of the video persuasiveness prediction module.

Referring now to FIG. 5, a simplified illustration of an embodiment 500 of the Video Persuasiveness Prediction Module 160 is shown. The Module 160 receives a video to be analyzed for persuasiveness from source 150. The Video Persuasiveness Prediction Module may comprise at least three submodules, Audio Segmentation and Classifier Module 510, Video Content Extraction and Classifier Module 512, and Text Content Extraction and Classifier Module 514. Using these three modules, the video persuasiveness prediction module 160 outputs a persuasive prediction indicator 162 for the input video, which can be accessed by or provided to requesting applications/devices/systems 170.

The disclosed technologies can predict viewer response using a combination of audio-visual content of a video and comments associated with the video. Given a video's audio-visual content, the sentiment polarity of the comments posted in response to the video may be predicted. This is done by clustering the test videos based on their sentiment histograms as described above, computed using SATSVM. Setting the number of clusters to 2, for example, and partitioning the set of test videos into two clusters that roughly correspond to videos that generated a negative response. While these clusters may roughly map to the persuasive and non-persuasive classes, the correspondence is not exact. Therefore, this is treated as a supervised classification problem, using the cluster indices as the class labels, which correspond to videos generating a positive and negative response. As features, the spectrogram features for audio and the fc7 features from the sentiment ontology for video may be used. The non-linear SVMs may be trained for classification based on unimodal features and a logistic regression based late fusion for multimodal fusion.

Figure 6:
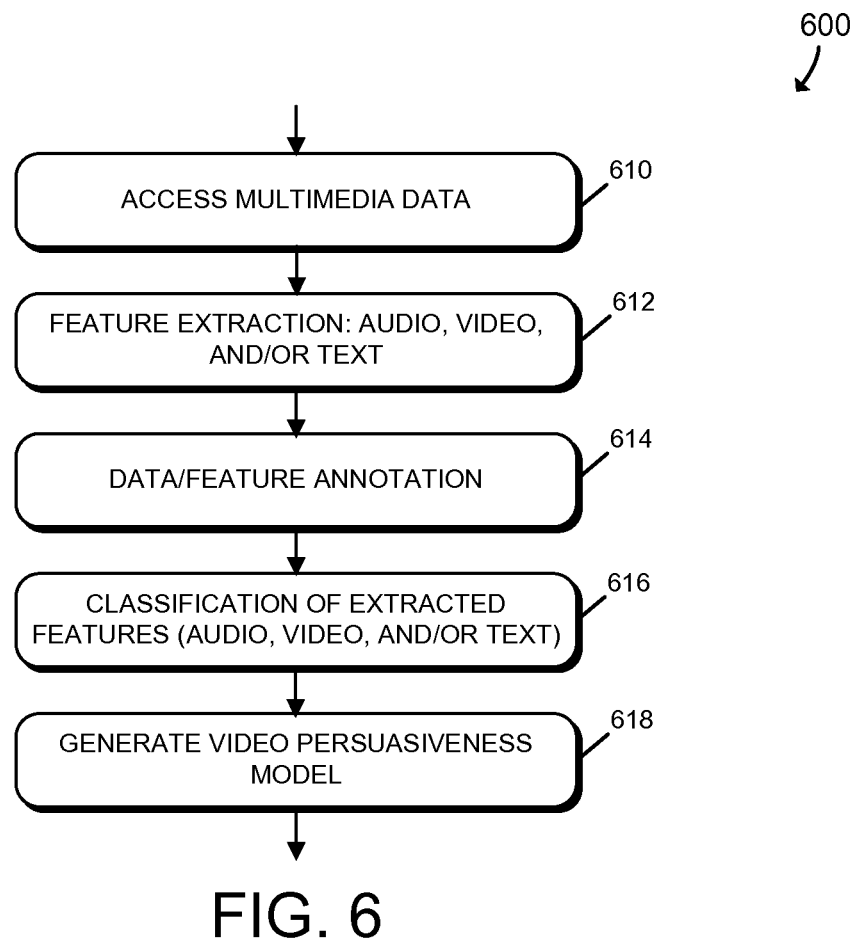
FIG. 6 is a simplified flow diagram of at least one embodiment of generating a video persuasiveness model.

Referring now to FIG. 6, an illustrative method for generating the video persuasiveness model 130 is shown. The method 600 may be embodied as computerized programs, routines, logic, and/or instructions. At block 610, the method receives/accesses multimedia data (e.g., videos). In block 612, the multimedia data undergoes feature extraction with respect to audio, video (or visuals), and/or text, as described in more detail above. In block 614, the data/features are annotated either by human subjects or using key algorithms as described in more detail above. In block 616 the classification of the extracted features (audio, video, and/or text) is established in response to step 614. Finally, in block 618 the method generates the video persuasiveness model. In general, the video persuasiveness model contains associations of multimedia content, features, and persuasiveness measurements. For example, the video persuasiveness model may indicate a mathematical (e.g., probabilistic or statistical) likelihood that a certain audio, visual and/or text feature or set of audio, visual and/or text features is a weak indicator or a strong indicator of persuasiveness.

Figure 7:
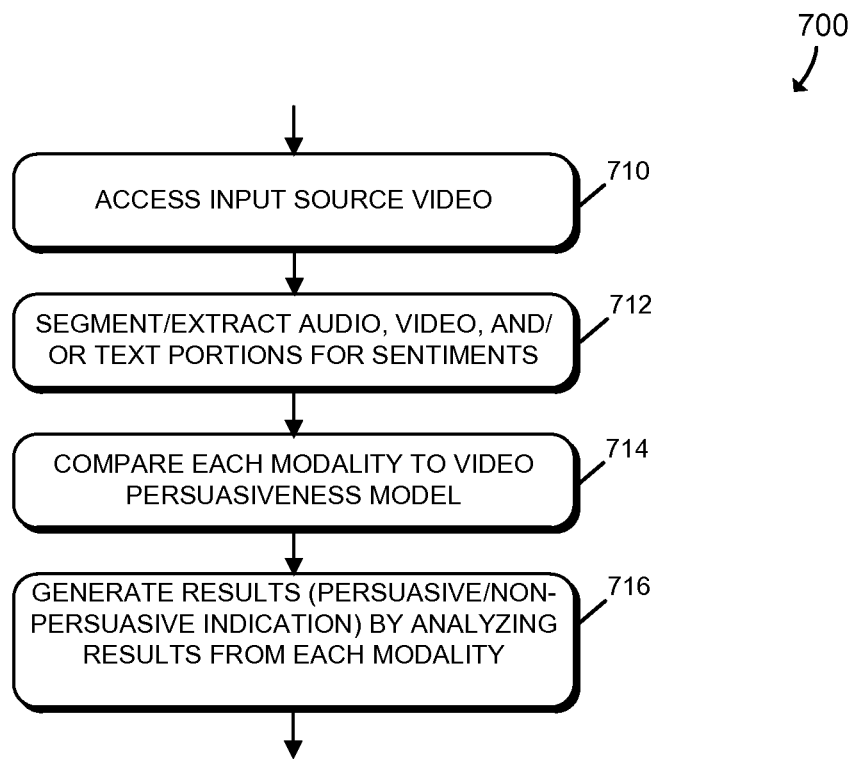
FIG. 7 is a simplified flow diagram of at least one embodiment of generating a persuasiveness indicator.

Referring now to FIG. 7, an illustrative method for determining a persuasiveness indicator for a multimedia item is shown. The method 700 may be embodied as computerized programs, routines, logic, and/or instructions. At block 710, the method accesses an input source video to be analyzed. At block 712, the accessed video is segmented and the audio, visual, and/or associated text (e.g., comments) portions are extracted and analyzed for semantics and sentiments as described above. At block 714, using the previously described video persuasiveness model, each modality extracted is (or a combination of extracted modalities) is individually or collectively compared to entries within the video persuasiveness model. In step 716, results are generated, providing an indication (e.g., persuasive, non-persuasive, highly persuasive, somewhat persuasive, etc.) by analyzing the results provided in the comparison made in step 714. These generated results may also be used to perform a comparison between two or more videos that have been analyzed by the method 700. In other words, the scores produced by the method 700 for two or more different videos can be compared to determine, e.g., whether one video is more persuasive than another, or to rank a list of videos according to persuasiveness.

Example Usage Scenarios

The components of the video analyzer system 101 have a number of different applications. Embodiments of the system 101 may enable the detection of persuasive multimedia content (e.g., videos) using a persuasiveness prediction module and further the training of the prediction module using existing videos, such as videos from video-sharing sites. For instance, the video analyzer system 101 may be used by a web or social media content curator to select or organize content, or to proactively recommend content that may be relevant or of interest to a certain user or set of users, or by a search engine or other content delivery mechanism to rank or arrange content on a display.

Implementation Examples

Figure 8:
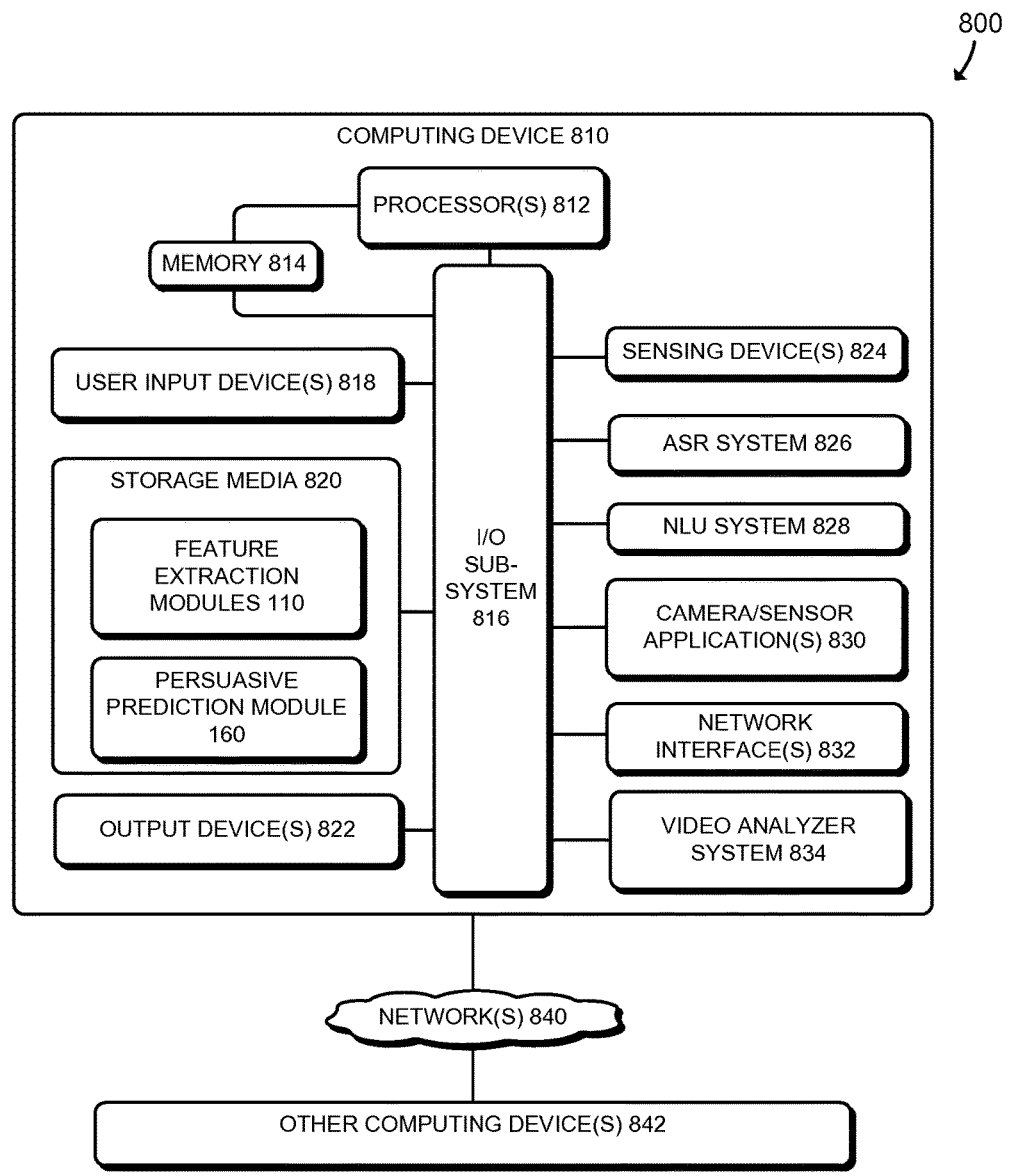
FIG. 8 is a simplified block diagram of an exemplary computing environment in connection with which at least one embodiment of the system of FIG. 1.

Referring now to FIG. 8, a simplified block diagram of an exemplary computing environment 800 for the computing system 100, in which the video persuasiveness prediction module 160 may be implemented, is shown. The illustrative implementation 800 includes a computing device 810, which may be in communication with one or more other computing systems or devices 842 via one or more networks 840. The computer device 810 comprises on storage media 820 feature extraction modules 110 and persuasive prediction module 160.

The illustrative computing device 810 includes at least one processor 812 (e.g. a microprocessor, microcontroller, digital signal processor, etc.), memory 814, and an input/output (I/O) subsystem 816. The computing device 810 may be embodied as any type of computing device such as a personal computer (e.g., a desktop, laptop, tablet, smart phone, wearable or body-mounted device, etc.), a server, an enterprise computer system, a network of computers, a combination of computers and other electronic devices, or other electronic devices. Although not specifically shown, it should be understood that the I/O subsystem 816 typically includes, among other things, an I/O controller, a memory controller, and one or more I/O ports. The processor 812 and the I/O subsystem 816 are communicatively coupled to the memory 814. The memory 814 may be embodied as any type of suitable computer memory device (e.g., volatile memory such as various forms of random access memory).

The I/O subsystem 816 is communicatively coupled to a number of components including one or more user input devices 818 (e.g., a touchscreen, keyboard, virtual keypad, microphone, etc.), one or more storage media 820, one or more output devices 822 (e.g., speakers, LEDs, etc.), one or more sensing devices 824, an automated speech recognition (ASR) system 826, a natural language understanding (NLU) system 828, one or more camera or other sensor applications 830 (e.g., software-based sensor controls), one or more network interfaces 832, and video analyzer system 834.

The storage media 820 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.). Portions of systems software or framework/middleware may be copied to the memory 814 during operation of the computing device 810, for faster processing or other reasons.

The one or more network interfaces 832 may communicatively couple the computing device 810 to a network, such as a local area network, wide area network, personal cloud, enterprise cloud, public cloud, and/or the Internet, for example. Accordingly, the network interfaces 832 may include one or more wired or wireless network interface cards or adapters, for example, as may be needed pursuant to the specifications and/or design of the particular computing system 800. The network interface(s) 832 may provide short-range wireless or optical communication capabilities using, e.g., Near Field Communication (NFC), wireless fidelity (Wi-Fi), radio frequency identification (RFID), infrared (IR), or other suitable technology.

The other computing system(s) 842 may be embodied as any suitable type of computing system or device such as any of the aforementioned types of devices or other electronic devices or systems. For example, in some embodiments, the other computing systems 842 may include one or more server computers used to store portions of the persuasive prediction module 160. The computing system 800 may include other components, sub-components, and devices not illustrated in FIG. 8 for clarity of the description. In general, the components of the computing system 800 are communicatively coupled as shown in FIG. 8 by electronic signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

A method for determining the persuasiveness of a multimedia item may comprise extracting a plurality of features from at least a portion of the multimedia item, the extracted features comprising a visual feature or an audio feature, identifying a text item associated with the multimedia item, extracting text from at least a portion of the text item, analyzing the extracted features and the extracted text using a video persuasiveness model, and generating a persuasiveness indication for the multimedia item based on the analysis using the video persuasiveness model. The method may further comprise wherein a video and the text item comprises one or more comments associated with the video, the extracted features comprise a combination of audio features and visual features extracted from the video, and the persuasiveness indication is generated based on an analysis of the combination of audio features and visual features and extracted text. The method may further comprise wherein the generating of the persuasiveness indication further comprises calculating a score based on an individual analysis of each of the extracted features and extracted text. The method may further comprise wherein the score is calculated by fusing individual scores calculated with respect to the individual extracted features and extracted text. The method may further comprise wherein the score fusion is performed using: an early fusion technique, a simple late fusion technique, or a learning based late fusion technique. The method may further comprise: comparing the persuasiveness indication of the multimedia item with a second persuasiveness indication associated with a second multimedia item and outputting, in response to the comparing, an output which indicates the more persuasive multimedia item or the less persuasive multimedia item An example method for building a video persuasiveness model may include accessing a plurality of multimedia items and text items associated with the multimedia items, extracting audio and visual features from the multimedia items, extracting text from the text items, annotating the extracted audio features, visual features, and text items with an indicator of persuasiveness based on a semantic analysis or an affective analysis of the visual features, an affective analysis of the audio features, and a sentiment analysis of the extracted text, classifying each of the multimedia items based on a combination of the annotations, and storing the classifications in the video persuasiveness model. The method may further comprise: determining, based on the affective analysis of the extracted audio features, an indication of the emotional content of the audio, and generating the indicator of persuasiveness based at least partly on the indication of emotional content of the audio. The method may further comprise: performing a sentiment analysis on the extracted visual features, and generating the indicator of persuasiveness based at least partly on the sentiment analysis performed on the extracted visual features. The method may further comprise: performing a sentiment analysis on the extracted text, and generating the indicator of persuasiveness based at least partly on the sentiment analysis performed on the extracted text.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for determining the persuasiveness of a multimedia item, the method comprising, with a computing system comprising one or more computing devices:
   using a visual feature extraction module, extracting a plurality of visual concept features from at least a portion of the multimedia item using automated machine learning techniques;
   using an affective feature extraction module of the visual feature extraction module, automatically analyzing the extracted visual concept features to identify sentiments of the extracted visual concept features using a first, trained neural network; and
   using a semantic feature extraction module of the visual feature extraction module, automatically analyzing the extracted visual concept features to identify semantic concepts of the extracted visual concept features using a second, different, trained neural network;
   using an audio feature extraction module, extracting an audio concept feature from at least a portion of the multimedia item using automated machine learning techniques;
   identifying a text item associated with the multimedia item and extracting text from at least a portion of the text item using a comment extraction module; and
   using a video persuasiveness prediction module,
      receiving the semantic concepts, sentiments and visual concept features from the visual feature extraction module, the audio concept feature from the audio feature extraction module and the text from the comment extraction module and
      comparing the semantic concepts, sentiments and visual concept features, the audio concept feature and the extracted text to semantic concepts, sentiments and visual concept features, audio concept features and text in a persuasiveness model having respective measures of audience impact, and
      generating a measure of audience impact for the multimedia item based on the comparison, wherein the measure of audience impact is used to determine the persuasiveness of the multimedia item.

2. The method of claim 1, wherein the multimedia item comprises a video and the text item comprises one or more comments associated with the video, the extracted features comprise a combination of audio concept features and visual concept features extracted from the video, and the measure of audience impact is generated based on an analysis of the combination of audio concept features and visual concept features and extracted text.

3. The method of claim 2, wherein the generating of the measure of audience impact further comprises calculating a score based on an individual analysis of each of the extracted features and extracted text.

4. The method of claim 3, wherein the score is calculated by fusing individual scores calculated with respect to the individual extracted features and extracted text.

5. The method of claim 4, wherein the score fusion is performed using: an early fusion technique, a simple late fusion technique, or a learning based late fusion technique.

6. The method of claim 1, further comprising:
   comparing the measure of audience impact of the multimedia item with a second measure of audience impact associated with a second multimedia item; and
   outputting, in response to the comparing, an output which indicates the more persuasive multimedia item or the less persuasive multimedia item.

7. A multimodal data analyzer to determine the persuasiveness of a multimedia item, comprising:

a processor to execute program instructions; and a memory in communication with the processor, the memory having stored therein at least one of programs and instructions executable by the processor to configure the multimodal data analyzer to implement:

a visual feature extraction module to extract a plurality of visual concept features from at least a portion of the multimedia item using automated machine learning techniques;

wherein the visual feature extraction module includes:

an affective feature extraction module to receive the multimedia item from an input and to automatically analyze the extracted visual concept features to identify sentiments of the extracted visual concept features using a first, trained neural network; and a semantic feature extraction module to receive the multimedia item from an input and to automatically analyze the extracted visual concept features to identify semantic concepts of the extracted visual concept features using a second, different, trained neural network;

an audio feature extraction module to receive the multimedia item from an input and to extract, an audio concept feature from at least a portion of the multimedia item using automated machine learning techniques;

a comment extraction module to identify a text item associated with the multimedia item and extract text from at least a portion of the text item; and a video persuasiveness prediction module, to receive the semantic concepts, sentiments and visual concept features from the visual feature extraction module, the audio concept feature from the audio feature extraction module and the text from the comment extraction module and to compare the semantic concepts, sentiments and visual concept features, the audio concept feature and the extracted text to semantic concepts, sentiments and visual concept features, audio concept features and text in a persuasiveness model having respective measures of audience impact and to generate a measure of audience impact for the multimedia item based on the comparison, wherein the measure of audience impact is used to determine the persuasiveness of the multimedia item.

8. The multimedia analyzer of claim 7, wherein the multimedia item comprises a video and the text item comprises one or more comments associated with the video, the extracted features comprise a combination of audio features and visual features extracted from the video, and the measure of audience impact is generated based on an analysis of the combination of audio features and visual features and extracted text.

9. The multimedia analyzer of claim 8, wherein the generating of the measure of audience impact further comprises calculating a score based on an individual analysis of each of the extracted features and extracted text.

10. The multimedia analyzer of claim 9, wherein the score is calculated by fusing individual scores calculated with respect to the individual extracted features and extracted text.

11. The multimedia analyzer of claim 10, wherein the score fusion is performed using: an early fusion technique, a simple late fusion technique, or a learning based late fusion technique.

12. The multimedia analyzer of claim 7, further configured to: compare the measure of audience impact of the multimedia item with a second measure of audience impact associated with a second multimedia item; and output, in response to the comparison, an output which indicates the more persuasive multimedia item or the less persuasive multimedia item.

13. A method for building a model of audience impact of a video, with a computing system comprising one or more computing devices, the method comprising:

accessing a plurality of multimedia items and text items associated with the multimedia items;

using a visual feature extraction module, extracting visual features from the multimedia items using automated machine learning techniques;

using an affective feature extraction module of the visual feature extraction module, automatically analyzing the extracted visual features to identify sentiments of the extracted visual features using a first, trained neural network; and using a semantic feature extraction module of the visual feature extraction module, automatically analyzing the extracted visual features to identify semantic concepts of the extracted visual features using a second, different, trained neural network;

using an audio feature extraction module, extracting an audio concept feature from at least a portion of the multimedia items using automated machine learning techniques;

extracting text from the text items using a comment extraction module;

using a video persuasiveness prediction module, annotating the identified semantic concepts and sentiments, the extracted audio features, visual features, and text items with a measure of audience impact based on the semantic analysis or the affective analysis of the visual features, an affective analysis of the audio features, and a sentiment analysis of the extracted text;

classifying each of the multimedia items based on a combination of the annotations; and storing the classifications in the audience impact model.

14. The method of claim 13, comprising: determining, based on the affective analysis of the extracted audio features, an indication of the emotional content of the audio, and generating the measure of audience impact based at least partly on the indication of emotional content of the audio.

15. The method of claim 13, comprising: generating the measure of audience impact based at least partly on the sentiment analysis performed on the extracted visual features.

16. The method of claim 13, comprising: performing a sentiment analysis on the extracted text, and generating the measure of audience impact based at least partly on the sentiment analysis performed on the extracted text.

17. A video classifier device for building a model of audience impact of a video, comprising:

a visual feature extraction module to extract visual features from a plurality of accessed multimedia items using automated machine learning techniques;

wherein the visual feature extraction module includes:

an affective feature extraction module to receive the multimedia items from an input and to automatically analyze the extracted visual concept features to identify sentiments of the extracted visual concept features using a first, trained neural network; and a semantic feature extraction module to receive the multimedia items from an input and to automatically analyze the extracted visual concept features to identify semantic concepts of the extracted visual concept features using a second, different, trained neural network;

an audio feature extraction module to receive the multimedia items from an input and to extract, an audio concept feature from at least a portion of the multimedia items using automated machine learning techniques;

a comment extraction module to extract text from accessed text items;

a video persuasiveness prediction module to annotate the identified semantic concepts and sentiments, the extracted audio features, visual features, and text items with a measure of audience impact based on the semantic analysis or the affective analysis of the visual features, an affective analysis of the audio features, and a sentiment analysis of the extracted text;

classify each of the multimedia items based on a combination of the annotations; and store the classifications in an audience impact model.

18. The video classifier device of claim 17, configured to: determine, based on the affective analysis of the extracted audio features, an indication of the emotional content of the audio, and generate the measure of audience impact based at least partly on the indication of emotional content of the audio.

19. The video classifier device of claim 17, configured to: generate the measure of audience impact based at least partly on the sentiment analysis performed on the extracted visual features.

20. The video classifier device of claim 17, configured to: perform a sentiment analysis on the extracted text, and generate the measure of audience impact based at least partly on the sentiment analysis performed on the extracted text.

\* \* \* \* \*